US012493089B2

(12) United States Patent
Machii et al.

(10) Patent No.: US 12,493,089 B2
(45) Date of Patent: Dec. 9, 2025

(54) MAGNETIC RESONANCE IMAGING APPARATUS

(71) Applicant: Canon Medical Systems Corporation, Otawara (JP)

(72) Inventors: Yutaka Machii, Nasushiobara (JP); Naoyuki Furudate, Otawara (JP); Motohiro Miura, Yaita (JP)

(73) Assignee: Canon Medical Systems Corporation, Otawara (JP)

( * ) Notice: Subject to any disclaimer, the term of this patent is extended or adjusted under 35 U.S.C. 154(b) by 182 days.

(21) Appl. No.: 18/459,516

(22) Filed: Sep. 1, 2023

(65) Prior Publication Data

US 2024/0085507 A1 Mar. 14, 2024

(30) Foreign Application Priority Data

Sep. 14, 2022 (JP) .................................. 2022-146422

(51) Int. Cl.
*G01R 33/54* (2006.01)
*G01R 33/385* (2006.01)

(52) U.S. Cl.
CPC ......... *G01R 33/543* (2013.01); *G01R 33/385* (2013.01)

(58) Field of Classification Search
CPC ................ G01R 33/543; G01R 33/385; G01R 33/3815; G01R 33/3852
See application file for complete search history.

(56) References Cited

U.S. PATENT DOCUMENTS

| 2010/0069738 | A1* | 3/2010 | Timinger | G01R 33/288 324/315 |
| 2014/0232402 | A1* | 8/2014 | Tsuda | G01R 33/389 324/309 |
| 2022/0146610 | A1 | 5/2022 | Kanazawa et al. | |

FOREIGN PATENT DOCUMENTS

JP 2022-76263 A 5/2022

* cited by examiner

*Primary Examiner* — G. M. A Hyder
(74) *Attorney, Agent, or Firm* — Oblon, McClelland, Maier & Neustadt, L.L.P.

(57) ABSTRACT

According to one embodiment, a magnetic resonance imaging apparatus includes a processing circuit. The processing circuit is configured to predict, based on an imaging sequence of magnetic resonance imaging and a relationship between a driving frequency of a gradient field coil and one of a magnet internal pressure and a magnet temperature of a static field magnet, the one of the magnet internal pressure and the magnet temperature at the time of execution of the imaging sequence, adjusts the imaging sequence based on a prediction result, and execute the adjusted imaging sequence.

8 Claims, 5 Drawing Sheets

MAGNETIC RESONANCE IMAGING APPARATUS

CROSS-REFERENCE TO RELATED APPLICATION

This application is based upon and claims the benefit of priority from Japanese Patent Application No. 2022-146422, filed Sep. 14, 2022, the entire contents of which are incorporated herein by reference.

FIELD

Embodiments described herein relate generally to a magnetic resonance imaging apparatus.

BACKGROUND

A Magnetic Resonance Imaging (MRI) apparatus magnetically excites a nuclear spin in an object by a Radio Frequency (RF) signal of a Larmor frequency and reconstructs an image from a nuclear magnetic resonance (NMR) signal generated along with the excitation. The MRI apparatus includes a gradient field coil that adds special positional information to an MR signal by applying a gradient field to an imaging space where an object is placed. The gradient field coil is vibrated by a Lorentz force when a pulse current is repetitively supplied during imaging. Also, the gradient field coil generates a leakage flux outside. If the vibration of the gradient field coil propagates into the magnet, or a vibration occurs in the magnet due to an eddy current generated by the leakage flux, heat is generated in the magnet, and liquid helium evaporates. Since this raises the internal pressure in a superconductive magnet, and the heat is conducted to a superconductive line, the superconductive magnet may be quenched. This phenomenon is called Gradient Coil Induced Heating (GCIH).

On the other hand, it is difficult to correctly predict quenching by GCIH in accordance with an imaging sequence. Hence, to prevent GCIH, a risk of an internal pressure rise in the superconductive magnet is suppressed using a sequence that misses a vibration resonance point of a gradient field coil, or the gradient field generation system of an MRI apparatus is driven safe by lowering the specifications of a sequence at the vibration resonance point.

As described above, in the MRI apparatus, to drive the gradient field generation system safe, an imaging sequence is executed based on conditions that are not optimized.

DETAILED DESCRIPTION

In general, according to one embodiment, a magnetic resonance imaging apparatus includes a processing circuit. The processing circuit is configured to predict, based on an imaging sequence of magnetic resonance imaging and a relationship between a driving frequency of a gradient field coil and one of a magnet internal pressure and a magnet temperature of a static field magnet, the one of the magnet internal pressure and the magnet temperature at the time of execution of the imaging sequence, adjusts the imaging sequence based on a prediction result, and execute the adjusted imaging sequence.

An embodiment of a Magnetic Resonance Imaging (MRI) apparatus will now be described in detail with reference to the accompanying drawings. In the following explanation, constituent elements having substantially same functions and configurations are denoted by same reference numerals, and a repetitive description thereof will be made only if necessary.

EMBODIMENT

Figure 1:
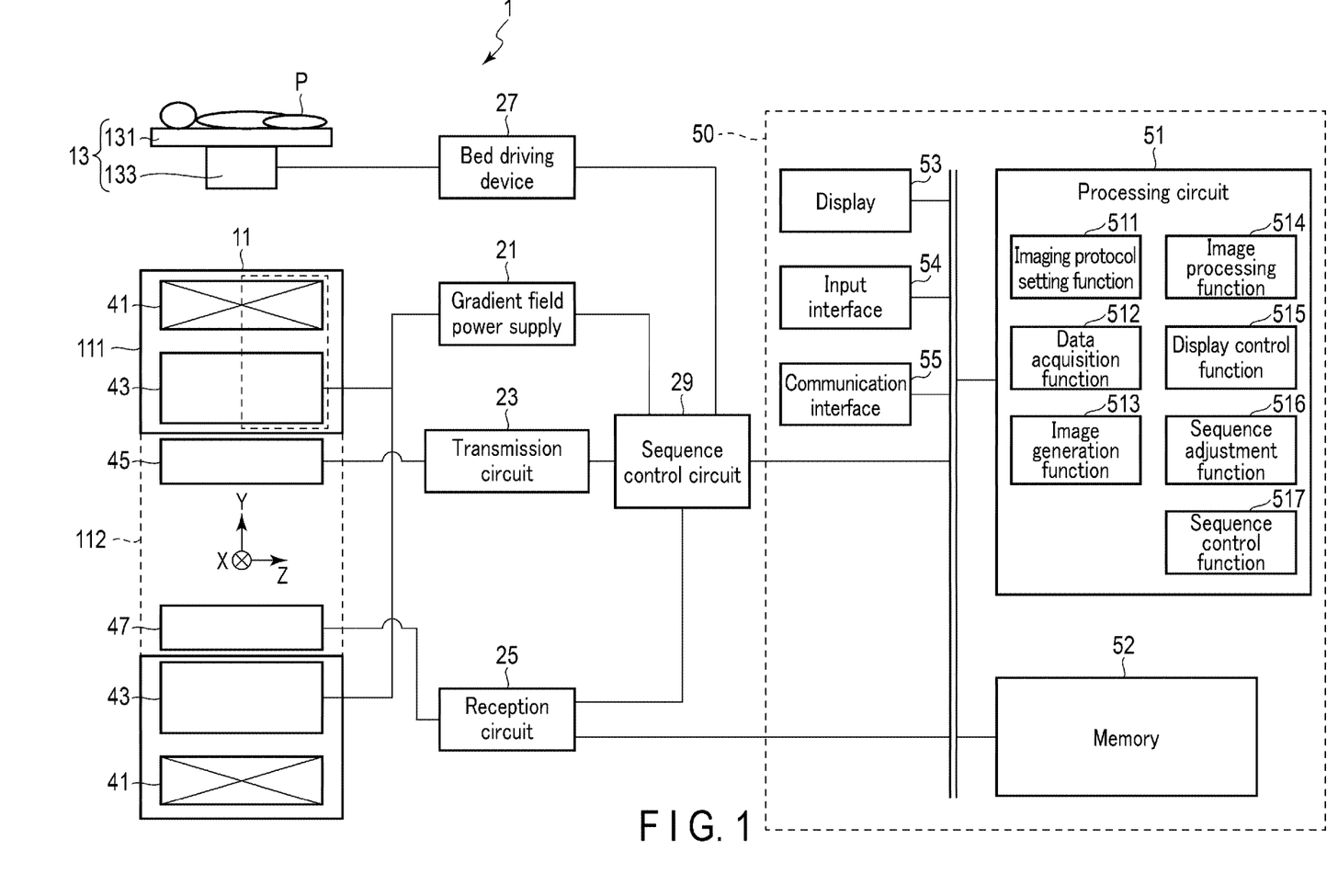
FIG. 1 is a view showing an example of the configuration of a magnetic resonance imaging apparatus according to the embodiment.

FIG. 1 is a view showing the control configuration of a magnetic resonance imaging apparatus 1 according to this embodiment. As shown in FIG. 1, the magnetic resonance imaging apparatus 1 includes a gantry 11, a bed 13, a gradient field power supply 21, a transmission circuit 23, a reception circuit 25, a bed driving device 27, a sequence control circuit 29, and a host computer 50. The host computer is an example of a data processing apparatus.

As shown in FIG. 1, the gantry 11 includes a static field magnet 41 and a gradient field coil 43. The static field magnet 41 and the gradient field coil 43 are stored in a housing 111 of the gantry 11. A bore 112 having a hollow shape is formed in the housing 111 of the gantry 11. A transmission coil 45 and a reception coil 47 are arranged in the bore 112 of the gantry 11.

The static field magnet 41 has a substantially cylindrical hollow shape and generates a static field in the substantial cylinder. As the static field magnet 41, for example, a permanent magnet, a superconductive magnet, or a resistive magnet is used. Here, the center axis of the static field magnet 41 is defined as a Z-axis, an axis that is orthogonal to the Z-axis in the vertical direction is defined as a Y-axis, and an axis that is orthogonal to the Z-axis in the horizontal direction is defined as an X-axis. The X-, Y-, and Z-axes form an orthogonal three-dimensional coordinate system.

The gradient field coil 43 is a coil unit that is formed into a substantially cylindrical hollow shape and attached to the inside of the static field magnet 41. As the gradient field coil 43, for example, an Active Shield Gradient Coil (ASGC) is used. The gradient field coil 43 generates a gradient field upon receiving a current supplied from a gradient field power supply 21. More specifically, the gradient field coil 43 includes three coils corresponding to the X-, Y-, and Z-axes that are orthogonal to each other. The three coils form gradient fields whose field strengths change along the X-, Y-, and Z-axes. The gradient fields along the X-, Y-, and Z-axes are combined, and a slice selective gradient field Gs, a phase encoding gradient field Gp, and a frequency encoding gradient field Gr, which are orthogonal to each other, are formed in desired directions. The slice selective gradient field Gs is used to arbitrarily decide an imaging cross section (slice). The phase encoding gradient field Gp is used to change the phase of a magnetic resonance signal (to be referred to as an MR signal hereinafter) in accordance with a spatial position. The frequency encoding gradient field Gr is used to change the frequency of an MR signal in accordance with a spatial position. Note that in the following description, the gradient direction of the slice selective gradient field Gs is the Z-axis, the gradient direction of the phase encoding gradient field Gp is the Y-axis, and the gradient direction of the frequency encoding gradient field Gr is the X-axis.

The gradient field power supply 21 supplies a current to the gradient field coil 43 in accordance with a sequence control signal from a sequence control circuit 29. The gradient field power supply 21 supplies the current to the gradient field coil 43, thereby causing the gradient field coil 43 to generate gradient fields along the X-, Y-, and Z-axes. The gradient fields are superimposed on the static field formed by the static field magnet 41 and applied to an object P.

The transmission coil 45 is arranged, for example, inside the gradient field coil 43, and generates a radio frequency magnetic field upon receiving an RF pulse supplied from the transmission circuit 23.

To apply an RF pulse for exciting a target proton existing in the object P to the object P via the transmission coil 45, the transmission circuit 23 supplies the RF pulse to the transmission coil 45. The RF pulse corresponds to a Larmor frequency decided by the type of a target nucleus and the strength of a magnetic field. The RF pulse vibrates at a resonance frequency unique to the target proton and excites the target proton. An MR signal is generated from the excited target proton and detected by the reception coil 47.

The reception coil 47 is fixed inside the bore 112. The reception coil 47 receives the MR signal generated from the target proton existing in an imaging part upon receiving the action of the RF pulse. The received MR signal is supplied to the reception circuit 25 by wire or wirelessly.

The reception circuit 25 receives the MR signal generated from the excited target proton via the reception coil 47. The reception circuit 25 processes the received MR signal, thereby generating a digital MR signal. The digital MR signal can be expressed in a k space defined by a spatial frequency. Hence, the digital MR signal will be referred to as k spatial data hereinafter. The k spatial data is a kind of raw data used for image reconstruction. The k spatial data is supplied to the host computer 50 by wire or wirelessly.

The bed 13 is installed adjacent to the gantry 11. The bed 13 includes a table-top 131 and a base 133. The object P is placed on the table-top 131. The base 133 supports the table-top 131 such that it can move along the Z-axis direction. Also, the base 133 supports the table-top 131 such that it can slide along the X-, Y-, and Z-axes. The base 133 stores the bed driving device 27. The bed driving device 27 moves the table-top 131 under the control of the sequence control circuit 29. The bed driving device 27 may include, for example, a motor such as a servo motor or a stepping motor.

The sequence control circuit 29 includes, as hardware resources, a processor such as a Central Processing Unit (CPU) or a Micro Processing Unit (MPU), and memories such as a Read Only Memory (ROM) and a Random Access Memory (RAM). The sequence control circuit 29 synchronously controls the gradient field power supply 21, the transmission circuit 23, and the reception circuit 25 based on an imaging protocol decided by an imaging protocol setting function 511 of a processing circuit 51, executes magnetic resonance imaging for the object P in accordance with a pulse sequence according to the imaging protocol, and collects k spatial data concerning the object P.

As shown in FIG. 1, the host computer 50 is a computer including the processing circuit 51, a memory 52, a display 53, an input interface 54, and a communication interface 55.

The processing circuit 51 includes a processor such as a CPU as a hardware resource. The processing circuit 51 functions as the core of the magnetic resonance imaging apparatus 1. For example, the processing circuit 51 executes various kinds of programs, thereby obtaining the imaging protocol setting function 511, a data acquisition function 512, an image generation function 513, an image processing function 514, a display control function 515, a sequence adjustment function 516, and a sequence control function 517.

Note that in FIG. 1, the single processing circuit 51 implements the imaging protocol setting function 511, the data acquisition function 512, the image generation function 513, the image processing function 514, the display control function 515, the sequence adjustment function 516, and the sequence control function 517. However, the processing circuit may be formed by combining a plurality of independent processors, and each processor may execute a program to implement each function. Also, the imaging protocol setting function 511, the data acquisition function 512, the image generation function 513, the image processing function 514, the display control function 515, the sequence adjustment function 516, and the sequence control function 517 may be called an imaging protocol setting circuit, a data acquisition circuit, an image generation circuit, an image processing circuit, a display control circuit, a sequence adjustment circuit, and a sequence control circuit, respectively, and may be implemented as individual hardware circuits. The above description of the functions to be executed by the processing circuit 51 also applies to the following embodiments and modifications.

The term "processor" used in the above description means, for example, a Central Processing Unit (CPU), Graphics Processing Unit (GPU), or a circuit such as an ASIC or a programmable logic device (for example, a Simple Programmable Logic Device (SPLD), a Complex Programmable Logic Device (CPLD), or a Field Programmable Gate Array (FPGA)). If the processor is, for example, a CPU, the processor reads out a program stored in a memory and executes it, thereby implementing a function. On the other hand, if the processor is an ASIC, a function is directly incorporated as a logic circuit in the circuit of the processor, instead of storing a program in a memory. Note that as for each processor according to this embodiment, other than a case where each processor is formed as a single circuit, a plurality of independent circuits may be combined to form one processor and implement its function. In addition, a plurality of constituent elements in FIG. 1 may be integrated to form one processor and implement its function. The above description of "processor" also applies to the following embodiments and modifications.

The memory 52 is a storage device configured to store various kinds of information, such as a Hard Disk Drive (HDD), a Solid State Drive (SSD), or an integrated circuit storage device. The memory 52 may be a driving device configured to read/write various kinds of information from/to a portable storage medium, such as a CD-ROM drive, a DVD drive, or a flash memory. For example, the memory 52 stores learned models, k spatial data, MR image data, control programs, and the like.

The display 53 displays various kinds of information by the display control function 515. For example, the display 53 displays an MR image generated by the image generation function 513, an MR image generated by the image processing function 514, a setting screen of an imaging protocol, or the like. As the display 53, for example, a CRT display, a liquid crystal display, an organic EL display, an LED display, a plasma display, or another arbitrary display known in this technical field can appropriately be used.

The input interface 54 includes an input device configured to accept various kinds of instructions from a user. As the input device, a keyboard, a mouse, various kinds of switches, a touch screen, a touch pad, and the like can be used. Note that the input device is not limited to a device such as a mouse or keyboard including physical operation components. For example, an electrical signal processing circuit configured to receive an electrical signal corresponding to an input operation from an external input device provided separately from the magnetic resonance imaging apparatus 1 and output the received electrical signal to various circuits is also included in the example of the input interface 54.

The communication interface 55 is an interface configured to connect the magnetic resonance imaging apparatus 1 to a workstation, a Picture Archiving and Communication System (PACS), a Hospital Information System (HIS), a Radiology Information System (RIS), and the like via a Local Area Network (LAN). The communication interface 55 transmits/receives various kinds of information to/from the workstation, the PACS, the HIS, and the RIS of the connection destinations.

The functions executed by the processing circuit 51 will be described next in detail.

By the imaging protocol setting function 511, the processing circuit 51 sets an imaging protocol concerning magnetic resonance imaging automatically or in accordance with a user instruction input via the input interface 54. The imaging protocol is a set of various kinds of imaging parameters concerning one magnetic resonance imaging. As the imaging parameters, various parameters directly or indirectly set to perform magnetic resonance imaging, such as a type of a pulse sequence, a type of a k space filling method, an imaging time, a repeating time (TR), and an echo time (TE), can be applied. As the pulse sequence, for example, Echo Planar Imaging (EPI) is used.

By the data acquisition function 512, the processing circuit 51 acquires MR data concerning a processing target such as the object P. MR data is a general term for k spatial data, MR image data, and hybrid data. The k spatial data may be original k spatial data, or may be data obtained by performing arbitrary data processing such as data compression processing, resolution decomposition processing, data interpolation processing, or resolution synthesis processing for original k spatial data. The hybrid data is data for which Fourier transform or inverse Fourier transform is executed along at least one axis of k spatial data.

By the image generation function 513, the processing circuit 51 reconstructs an MR image concerning the object P based on MR data acquired from the reception circuit 25. For example, the processing circuit 51 performs Fourier transform for MR data arranged in a k space or a frequency space, thereby generating an MR image defined in a real space. In place of Fourier transform or in combination with Fourier transform, iterative approximation reconstruction or reconstruction using a machine learning model may be performed. The processing circuit 51 that implements the image generation function 513 is an example of a reconstruction unit.

By the image processing function 514, the processing circuit 51 performs various kinds of image processing for an MR image. For example, the processing circuit 51 performs image processing such as volume rendering, surface rendering, pixel value projection processing, Multi-Planer Reconstruction (MPR) processing, or Curved MPR (CPR) processing.

By the display control function 515, the processing circuit 51 displays various kinds of information on the display 53. For example, the processing circuit 51 displays, on the display 53, an MR image generated by the image generation function 513, an MR image generated by the image processing function 514, a setting screen of an imaging protocol, or the like.

By the sequence adjustment function 516, the processing circuit 51 estimates energy that causes a magnet internal pressure rise in the static field magnet 41 at the time of execution of an imaging sequence using a circuit model considering Gradient Coil Induced Heating (GCIH), and adjusts the imaging sequence based on the estimation result before execution of the imaging sequence. The processing circuit 51 that implements the sequence adjustment function 516 is an example of a sequence adjustment unit. GCIH is a phenomenon that the gradient field coil is vibrated by a Lorentz force when a pulse current is repetitively supplied to the gradient field coil 43 during imaging, a helium container 63 generates heat due to the vibration, liquid helium is thus heated and vaporized, and the magnet internal pressure consequently rises. If heat generation continues, quenching that a superconductive coil 65 exceeds a critical temperature and changes to a normal conducting state may occur. In recent years, since a frequency to be used or a magnetic field to be applied has become strong, the influence of GCIH cannot be ignored.

A principle of GCIH occurrence will be described next in detail.

Figure 2:
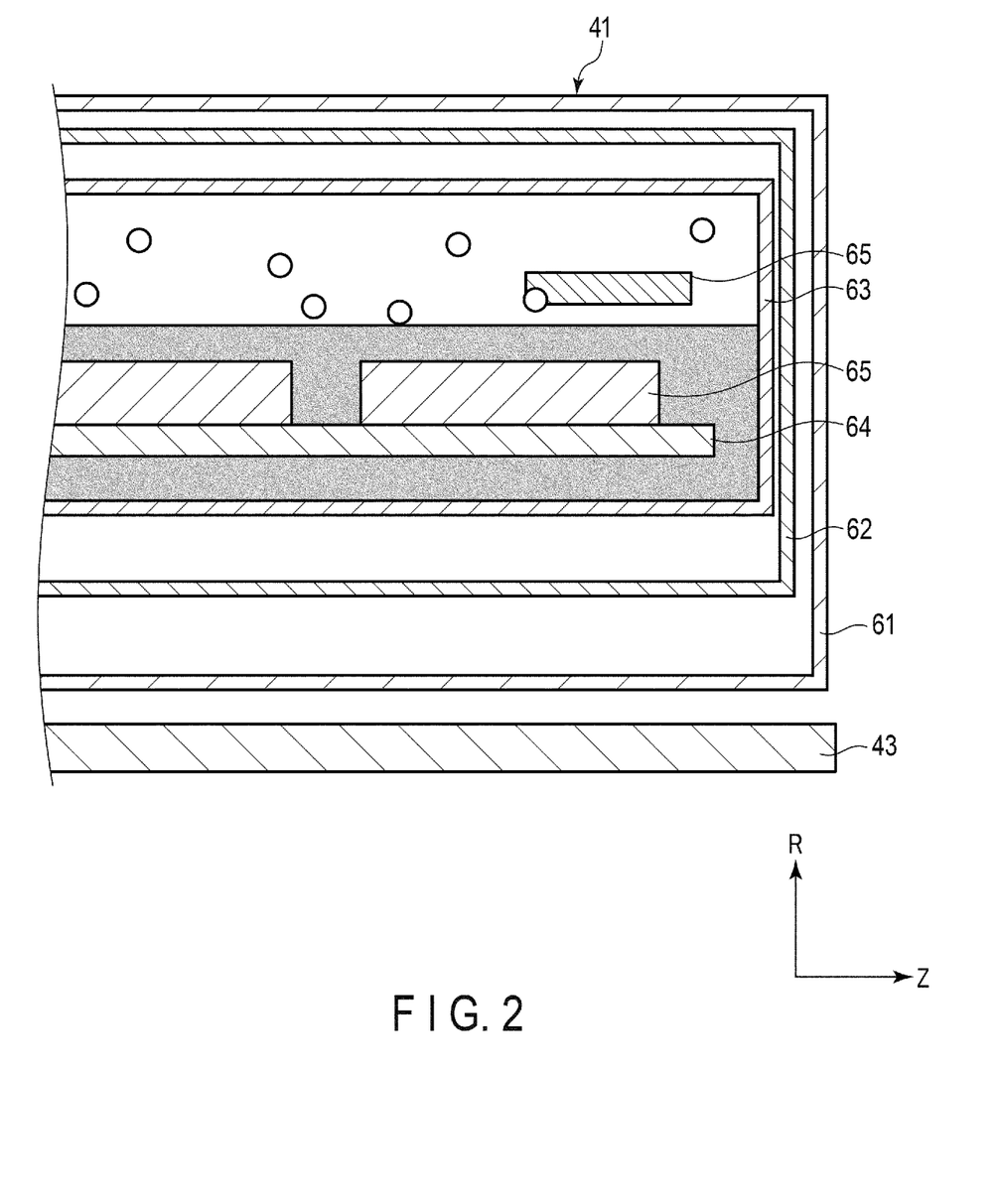
FIG. 2 is a view showing an example of the structure of the magnetic resonance imaging apparatus according to the embodiment.

FIG. 2 is a view showing the internal structure of the static field magnet 41. FIG. 2 shows a region surrounded by a broken line in FIG. 1. FIG. 2 is a sectional view showing a cross section from the center line of the bore 112 outward in the radial direction. An R direction in FIG. 2 indicates a direction from the center line of the bore 112 to an arbitrary direction included in the X-Y plane. That is, the structure in a case where the R direction in FIG. 2 matches the X-axis in FIG. 1 is the same as the structure in a case where the R direction in FIG. 2 matches the Y-axis in FIG. 1.

As shown in FIG. 2, the static field magnet 41 includes a vacuum container 61, a radiation shield 62, the helium container 63, a support structure 64, and the superconductive coil 65.

The vacuum container 61 is a housing that forms the exterior of the static field magnet 41. The helium container 63 is provided inside the vacuum container 61. The radiation shield 62 is attached between the vacuum container 61 and the helium container 63. Heat shielding is ensured between the vacuum container 61 and the helium container 63. The support structure 64 and the superconductive coil 65 are provided inside the helium container 63. The support structure 64 is fixed to the helium container 63 and supports the superconductive coil 65. The helium container 63 is filled with liquid helium, and the superconductive coil 65 is kept in a superconducting state.

During imaging, if a pulse current is repetitively supplied to the gradient field coil 43, a Lorentz force is generated, and the gradient field coil 43 mechanically vibrates. If the gradient field coil 43 vibrates, the vibration of the gradient field coil 43 is transmitted to the radiation shield 62, and the radiation shield 62 vibrates. In the radiation shield 62, an eddy current is generated due to the vibration of the radiation shield 62 in a static field and a magnetic field is generated by the eddy current. If the magnetic field due or the eddy current is generated in the radiation shield 62, the magnetic field interlinks with the support structure 64 inside the helium container 63, and heat is thus generated in the helium container 63. If the generated heat is then transmitted to the liquid helium, the liquid helium vaporizes, and the internal pressure of the helium container 63 rises. In addition, if a magnetic field is generated by an eddy current generated in the support structure 64, and the generated magnetic field interlinks with the radiation shield 62, a new eddy current is generated in the radiation shield 62. During imaging, the heat generating and the internal pressure rise repetitive occur in the helium container 63 until driving of the gradient field coil 43 ends. If the amount of heat generated in the helium container 63 becomes large, the superconducting state cannot be maintained because the temperature of the superconductive coil 65 exceeds a critical temperature, and the helium that has vaporized by quenching is discharged to the outside.

Also, during imaging, if a leakage flux of a gradient field generated by the gradient field coil 43 occurs in the radiation shield 62, an eddy current flows to the radiation shield 62, and the radiation shield 62 vibrates due to the eddy current. Then, an eddy current is generated due to the vibration of the radiation shield 62 in the static field, and as described above, heat generation and an internal pressure rise repetitively occur in the helium container 63. It is considered that the rise of the magnet internal pressure of the static field magnet 41 has a proportional relationship with the heat input (heat generation) to the magnet by scan. For this reason, if scan is continued even after the rise rate of the magnet internal pressure per hour increases up to a predetermined value, the temperature of a superconductive line rises up to a level that causes quenching. Hence, the internal pressure rise rate per hour serves as a measure of possibility of quenching occurrence.

As described above, because the mechanical vibration of the gradient field coil 43 is physically transmitted to the radiation shield 62, and the radiation shield 62 vibrates due to the leakage flux, a phenomenon that the rise rate of the magnet internal pressure increases up to a predetermined value occurs. That is, it is considered that GCIH occurs due to the two factors, that is, transmission of the mechanical vibration to the radiation shield 62, and the vibration of the radiation shield 62 caused by the influence of the leakage flux.

The frequency characteristic of the magnet internal pressure rise rate by GCIH will be described next.

Figure 3:
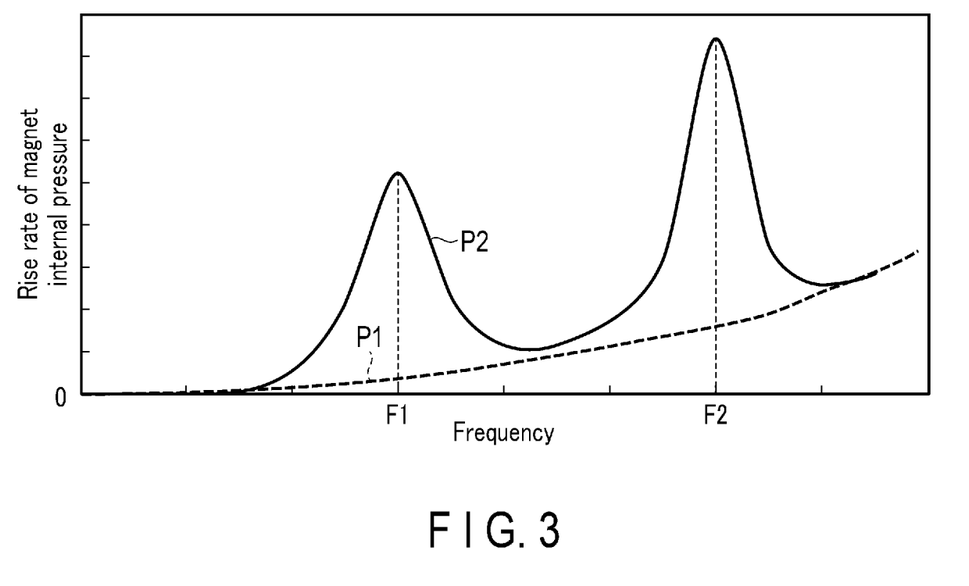
FIG. 3 is a graph showing an example of the relationship between a frequency and a magnet internal pressure associated with the magnetic resonance imaging apparatus according to the embodiment.

FIG. 3 is a graph showing the relationship between the frequency (to be also referred to as a driving frequency) of a current supplied from the gradient field power supply 21 to the gradient field coil 43 and the rise rate of the magnet internal pressure. The abscissa in FIG. 3 represents the driving frequency of the gradient field coil 43. The ordinate in FIG. 3 represents the rise rate of the magnet internal pressure when the frequency plotted along the abscissa is used at a predetermined current for a predetermined time (for example, 10 min). P1 in FIG. 3 indicates the value of the rise rate of the magnet internal pressure derived from a leakage flux in a case where resonance is absent. The rise rate is the ratio of a rise value with respect to a value before a change. P2 in FIG. 3 indicates the actually observed rise rate of the magnet internal pressure. This indicates the sum of the value of the rise rate of the magnet internal pressure derived from a leakage flux and the value of the rise rate of the magnet internal pressure derived from the resonance of the mechanical vibration of the gradient field coil 43. As described above, the mechanical vibration or the leakage flux is transmitted to the radiation shield 62, and the radiation shield 62 vibrates due to the influence of the leakage flux. For this reason, the internal pressure rise rate P1 indicated by a dotted line is generated, and additionally, a peak is generated in the internal pressure rise rate, like P2, due to the characteristic vibration of the mechanical vibration and actually observed.

The magnitude of the vibration of the radiation shield 62 changes depending on the frequency of a gradient field. For example, the higher the frequency of the gradient field is, the larger the magnitude of the vibration of the gradient field coil 43 derived from the leakage flux is. Hence, as indicated by P1 in FIG. 3, the higher the frequency of the gradient field is, the larger the value of the rise rate of the magnet internal pressure derived from the leakage flux is.

A structure such as the gradient field coil 43 or a heat shield in the magnet has a resonance point. That is, the closer the frequency of the gradient field is to the resonance point, the larger the magnitude of the mechanical vibration of the structure such as the gradient field coil 43 or the heat shield in the magnet is. Hence, as indicated by P2 in FIG. 3, the value of the rise rate of the magnet internal pressure of the static field magnet 41 derived from the mechanical vibration of the gradient field coil 43 becomes large at resonance points F1 and F2. The size or the number of resonance points changes depending on the structure, the material, and the characteristic of the static field magnet 41 or the gradient field coil 43.

As described above, since the rise rate value of the internal pressure of the static field magnet 41 has the frequency characteristic shown in FIG. 3, the imaging sequence needs to be adjusted in consideration of this frequency characteristic. Hence, by the sequence adjustment function 516, the processing circuit 51 predicts the magnet internal pressure or magnet temperature at the time of execution of the imaging sequence based on the imaging sequence of magnetic resonance imaging and the relationship between the driving frequency of the gradient field coil 43 and the magnet internal pressure or magnet temperature of the static field magnet 41, and adjusts the imaging sequence based on the prediction result. In this embodiment, energy that causes the rise of the magnet internal pressure at the time of execution of the imaging sequence is estimated using a circuit model considering the frequency characteristic P1 of the rise rate of the actual magnet internal pressure, and the imaging sequence is adjusted based on the estimation result before execution of the imaging sequence. More specifically, using an equivalent circuit to the magnet internal pressure of the static field magnet as a circuit model, the processing circuit 51 calculates a current value flowing to the equivalent circuit based on the imaging sequence, and adjusts the imaging sequence based on the calculated current value. More specifically, the processing circuit 51 calculates energy to be consumed by the equivalent circuit based on the current value flowing to the equivalent circuit, predicts the rise rate of the magnet internal pressure based on the calculated energy, and adjusts the imaging sequence based on the rise rate. At this time, the processing circuit 51 estimates the heat input amount into the magnet based on the rise rate of the magnet internal pressure, and adjusts the imaging sequence such that the heat input amount does not exceed a threshold associated with quenching.

The equivalent circuit includes a first circuit connected to a power supply equivalent to the gradient field power supply 21 and having a self-inductance, and a second circuit having a mutual inductance with the first circuit. The second circuit includes a closed circuit that resonates between the capacitance component of the circuit and a second inductor coupled with the first circuit by the mutual inductance. The resonance characteristic of the second circuit is set based on the relationship between the driving frequency of the gradient field coil 43 and the magnet internal pressure. If not only one frequency but also many frequencies exist as the resonance characteristic, the equivalent circuit includes second circuits as many as the number of resonance frequencies. The second circuit calculates the rise rate of the magnet internal pressure derived from the mechanical vibration of the gradient field coil 43. In addition, to calculate the portion of the rise rate P1 of the magnet internal pressure derived from the leakage flux in FIG. 3, the equivalent circuit includes a third circuit formed by a third inductor coupled with the inductor of the first circuit by mutual induction and a resistor. The portion of P1 in FIG. 3 is calculated by the second circuit and the third circuit. If the curve of P1 in FIG. 3 cannot be expressed by the single third circuit, a necessary number of circuits each including a third inductance having a different constant and a resistor may be provided. The second circuit and the third circuit calculate the portion of P2 in FIG. 3, which represents the sum of the rise rate of the magnet internal pressure derived from the leakage flux and the rise rate of the magnet internal pressure derived from the mechanical vibration of the gradient field coil 43.

For example, the equivalent circuit includes a primary circuit representing a current that matches a gradient field waveform, and one or more secondary circuits to which an induction current flows. The secondary circuit is formed by a circuit representing the frequency characteristic of the vibration of the gradient field coil 43, and a circuit representing the offset of the internal pressure rise rate caused by the leakage flux.

Referring back to FIG. 1, by the sequence control function 517, the processing circuit 51 generates the information of the imaging sequence based on imaging conditions input from an operator, and transmits the generated information of the imaging sequence to the sequence control circuit 29, thereby controlling imaging. At this time, the processing circuit 51 executes the imaging sequence adjusted by the processing of the sequence adjustment function 516. Also, by the sequence control function 517, the processing circuit 51 receives MR data from the sequence control circuit 29 and stores the received MR signal data in the memory 52. The processing circuit 51 that implements the sequence control function 517 is an example of a sequence control unit.

Figure 4:
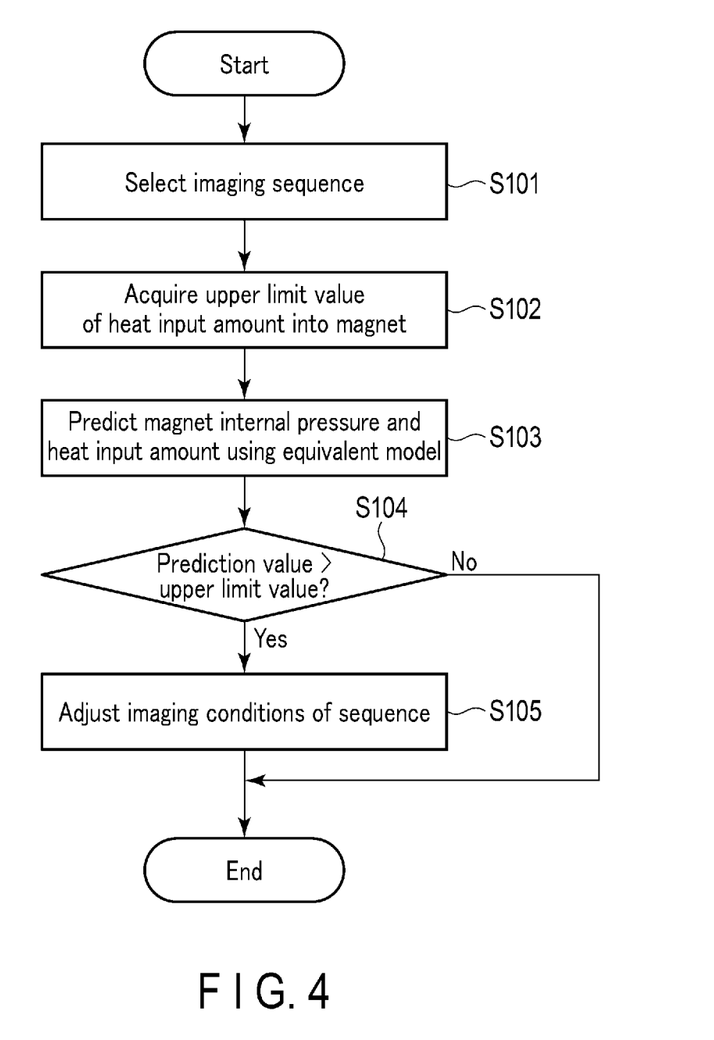
FIG. 4 is a flowchart showing the processing procedure of sequence adjustment processing by the magnetic resonance imaging apparatus according to the embodiment.

The operation of sequence adjustment processing executed by the processing circuit 51 in the sequence adjustment function 516 will be described next. Sequence adjustment processing is processing for adjusting the sequence in consideration of the frequency characteristic of the magnet pressure rise rate before execution of the sequence such that quenching does not occur due to GCIH. FIG. 4 is a flowchart showing an example of the procedure of sequence adjustment processing. Note that the processing procedure of each process to be described below is merely an example, and each process can appropriately be changed as much as possible. Also, as for the processing procedure to be described below, steps can be omitted, replaced, or added appropriately in accordance with the embodiment.

(Sequence Adjustment Processing)
(Step S101)

By the sequence adjustment function 516, the processing circuit 51 first selects an imaging sequence to be adjusted. The imaging sequence to be adjusted may be selected in accordance with a user input, or all registered imaging sequences may be selected one by one in turn.

(Step S102)

Next, the processing circuit 51 acquires the upper limit value of the heat input amount to the static field magnet 41. The upper limit value of the heat input amount is stored in, for example, the memory 52 in advance. The upper limit value of the heat input amount is set to, for example, a value smaller than a threshold at which quenching occurs. For example, the upper limit value of the heat input amount is set to a value 0.9 times the threshold at which quenching occurs.

(Step S103)

Next, the processing circuit 51 calculates the magnet internal pressure and the heat input amount into the magnet at the time of execution of the selected sequence using an equivalent circuit considering Gradient Coil Induced Heating (GCIH).

Figure 5:
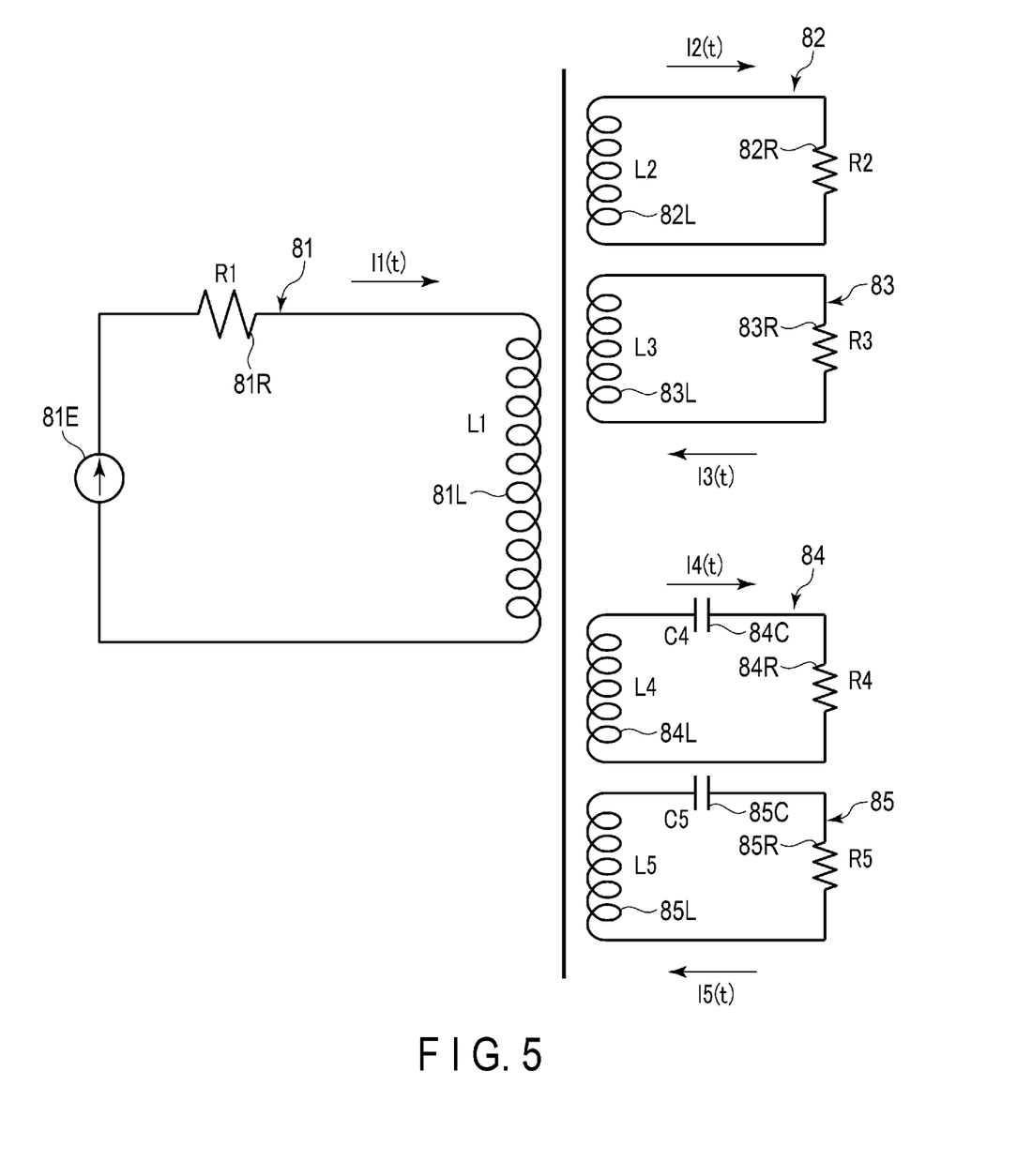
FIG. 5 is a view showing an example of an equivalent circuit used in sequence adjustment processing by the magnetic resonance imaging apparatus according to the embodiment.

The equivalent circuit used as a circuit model in the sequence adjustment processing will be described here in detail.

FIG. 5 is a view showing an example of the equivalent circuit. As shown in FIG. 5, the equivalent circuit includes a circuit 81 connected to the gradient field power supply 21, and four closed circuits 82 to 85. The circuit 81 is a primary side circuit, and is an example of the first circuit. The closed circuits 82 to 85 are secondary side circuits. The closed circuits 84 and 85 are an example of the second circuit. The closed circuits 82 and 83 are an example of the third circuit.

The circuit 81 is a circuit in which a power supply 81E corresponding to the gradient field power supply 21, a resistor 81R, and a coil 81L are connected in series. The power supply 81E corresponds to an X-axis gradient field power supply or a Y-axis gradient field power supply included in the gradient field power supply 21.

The closed circuit 82 is a circuit in which a resistor 82R and a coil 82L are connected in series. The closed circuit 83 is a circuit in which a resistor 83R and a coil 83L are connected in series. The closed circuit 84 is a resonance circuit in which a resistor 84R, a coil 84L, and a capacitor 84C are connected in series. The closed circuit 85 is a resonance circuit in which a resistor 85R, a coil 85L, and a capacitor 85C are connected in series. Each of the coils 82L to 85L is electromagnetically coupled with the coil 81L of the circuit 81 that is the primary side circuit.

Here, the resistance values of the resistors 81R, 82R, 83R, 84R, and 85R are defined as R1, R2, R3, R4, and R5, respectively. The self-inductance values of the coils 81L, 82L, 83L, 84L, and 85L are defined as L1, L2, L3, L4, and L5, respectively. The electrostatic capacitances of the capacitors 84C and 85C are defined as C4 and C5, respectively. The mutual inductance value between the coil 81L and the coil 82L is defined as M12, the mutual inductance value between the coil 81L and the coil 83L is defined as M13, the mutual inductance value between the coil 81L and the coil 84L is defined as M14, and the mutual inductance value between the coil 81L and the coil 85L is defined as M15.

Also, current values flowing to the circuits 81, 82, 83, 84, and 85 are defined as I1(t), I2(t), I3(t), I4(t), and I5(t), respectively. The current values I1(t) to I5(t) are functions of time t. Circuit equations hold for the circuit 81 and the closed circuit 82 and for the circuit 81 and the closed circuit 83. The current value I1(t) corresponds to the frequency of the pulse sequence of a gradient field. That is, the time change of the current value I1(t) corresponds to the waveform change of the frequency of the pulse sequence.

The resistance values (R1 to R5) of the resistors (81R to 85R), the self-inductance values (L1 to L5) of the coils (81L to 85L), the electrostatic capacitances (C4 and C5) of the capacitors (84C and 85C), and the mutual inductance values (M12 to M15) are set in advance such that a sum E of energies (E2 to E5) consumed by the secondary circuits (closed circuits 82 to 85) matches the frequency characteristic of the rise rate value of the magnet internal pressure shown in FIG. 3. These parameters may be decided experimentally or theoretically.

For example, when experimentally deciding the parameters, in a state in which the gradient field power supply output of the actual apparatus is set to a predetermined value in a sine wave form, the rise rate of the magnet internal pressure is measured while changing the frequency, thereby obtaining the rise rate of the magnet internal pressure indicated by P2 in FIG. 3. Next, in a state in which the current value of the power supply 81E in FIG. 5 is set constant, the frequency is changed, and the values L2, L3, L4, L5, R2, R3, R4, R5, C4, and C5 are adjusted such that the sum of power consumption of R2, R3, R4, and R5 draws a curve similar to P2 in FIG. 3.

The energy consumed by the closed circuits 82 and 83 corresponds to the rise rate of the magnet internal pressure derived from the leakage flux. The parameters of the constituent elements of the closed circuits 82 and 83 are set such that these match the frequency characteristic of the rise rate value of the magnet internal pressure derived from the leakage flux as indicated by P1 in FIG. 3. In FIG. 5, two closed circuits corresponding to the frequency characteristic of the rise rate value of the magnet internal pressure derived from the leakage flux are provided. However, the number of closed circuits corresponding to the leakage flux, which are provided in the equivalent circuit, may be one or three or more. The larger the number of closed circuits corresponding to the leakage flux is, the more the accuracy of predicting the frequency characteristic of the rise rate value of the magnet internal pressure derived from the leakage flux can be improved. Note that if the rise rate of the magnet internal pressure derived from the leakage flux is small, the closed circuit corresponding to the frequency characteristic of the rise rate value of the magnet internal pressure derived from the leakage flux may not be provided.

The energy consumed by the closed circuits 84 and 85 that are resonance circuits corresponds to the rise rate of the magnet internal pressure derived from the mechanical vibration of the gradient field coil 43. Hence, the parameters of the constituent elements of the closed circuits 84 and 85 are set such that these match the frequency characteristic of the rise rate value of the magnet internal pressure derived from the mechanical vibration of the gradient field coil 43. In addition, each of the circuits 84 and 85 corresponds to one of the resonance points F1 and F2. The closed circuits 84 and 85 are set such that the consumed energy corresponds to the rise rate value of the magnet internal pressure near the corresponding resonance point. Resonance circuits corresponding to the mechanical vibration of the gradient field coil 43 are provided, for example, as many as the number of resonance points included in the frequency band used in the sequence.

Referring back to FIG. 4, in the process of step S103, when calculating the prediction value of the maximum value of the magnet internal pressure during execution of the sequence, the processing circuit 51 first calculates the current values I2(t) to I5(t) flowing to the closed circuits 82 to 85. At this time, the processing circuit 51 solves, for each time, the differential equation of the circuit equation in the equivalent circuit based on the imaging sequence to be executed in magnetic resonance imaging, thereby calculating the current values I2(t) to I5(t) flowing to the closed circuits 82 to 85 at each time. As the method of calculating the current values I2(t) to I5(t), a known method using Laplace transform for the differential equation of the circuit equation in the equivalent circuit can be used. Alternatively, after the general solution of the differential equation is solved by the method of separation of variables, a particular solution may be solved by the method of variation of constants.

Next, using the calculation result of the current values I2(t) to I5(t), the processing circuit 51 calculates the consumption energies E2 to E5 consumed by the resistors 82R to 85R of the closed circuits 82 to 85 at each time. The consumption energies E2 to E5 can be calculated using for example, equations (1) below. In equations (1), Z4 and Z5 are impedances in the closed circuits 84 and 85. The impedances Z4 and Z5 can be calculated using, for example, equations (2) below.

$$\left.\begin{array}{l} E2 = \int_0^{\Delta t} R2 I2(t)^2 dt \\ E3 = \int_0^{\Delta t} R3 I3(t)^2 dt \\ E4 = \int_0^{\Delta t} Z4 I4(t)^2 dt \\ E5 = \int_0^{\Delta t} Z5 I5(t)^2 dt \end{array}\right\} \quad (1)$$

$$\left.\begin{array}{l} Z4 = j\omega L4 + \dfrac{1}{j\omega C4} + R4 \\ Z5 = j\omega L5 + \dfrac{1}{j\omega C5} + R5 \end{array}\right\} \quad (2)$$

Next, the processing circuit 51 adds the sum E of the consumption energies E2 to E5 at each time until the selected imaging sequence ends, thereby calculating the consumption energy on the equivalent circuit in the imaging sequence.

Next, the processing circuit 51 estimates the heat input amount into the magnet using the consumption energy on the equivalent circuit in the imaging sequence as the rise rate value of the magnet internal pressure. At this time, the consumption energy on the equivalent circuit per unit time is used as the heat input amount into the magnet.

In this way, the processing circuit 51 estimates the heat input amount into the magnet after execution of the sequence based on the current values I2(t) to I5(t) flowing to the closed circuits 82 to 85 of the equivalent circuit.
(Step S104)

Next, the processing circuit 51 compares the prediction value of the heat input amount into the magnet with the upper limit value, thereby determining whether the heat input amount exceeds the upper limit value upon execution of the selected sequence.

If the prediction value of the heat input amount is equal to or smaller than the upper limit value, that is, if the prediction value of the heat input amount does not exceed the upper limit value (NO in step S104), the processing circuit 51 judges that adjustment of the selected sequence is unnecessary, and ends the sequence adjustment processing for the selected sequence.

(Step S105)

If the heat input amount is larger than the upper limit value, that is, if the prediction value of the heat input amount exceeds the upper limit value (YES in step S104), the processing circuit 51 judges that adjustment of the selected sequence is necessary, and adjusts the imaging conditions and the like of the selected sequence such that the prediction value of the heat input amount after execution of the sequence becomes equal to or smaller than the upper limit value. For example, Field Of View (FOV) in imaging is expanded. Thus, the current value output from the gradient field power supply 21 becomes small, the heat input amount by GCIH decreases, and the rise rate value of the magnet internal pressure becomes small. Instead of expanding the FOV, Repetition Time (TR) in imaging may be increased. Alternatively, an Echo Train Space (ETS) in an EPI sequence may be changed to avoid the resonance frequency of the gradient field coil 43. In this case as well, the heat input amount by GCIH decreases, and the rise rate value of the magnet internal pressure becomes small.

If the adjustment of the sequence ends, the processing circuit 51 updates sequence information recorded in the memory 52 or the like based on the sequence after the adjustment, and ends the sequence adjustment processing. Note that it is preferable to execute the processes of steps S101 to S104 again using the sequence after the adjustment to repetitive adjust the imaging conditions of the sequence until optimum imaging conditions are set.

The effects of the magnetic resonance imaging apparatus 1 according to this embodiment will be described below.

The magnetic resonance imaging apparatus 1 according to this embodiment can predict the magnet internal pressure or magnet temperature at the time of execution of the imaging sequence based on the imaging sequence of magnetic resonance imaging and the relationship between the driving frequency of the gradient field coil 43 and the magnet internal pressure or magnet temperature of the static field magnet 41, adjust the imaging sequence based on the prediction result, and execute the adjusted imaging sequence. More specifically, using an equivalent circuit to the internal pressure of the static field magnet 41, the magnetic resonance imaging apparatus 1 can calculate current values flowing to the equivalent circuit when executing the imaging sequence, adjust the imaging sequence based on the sum of the current values, and execute the adjusted imaging sequence. The equivalent circuit includes the circuit 81 connected to the power supply 81E and having the self-inductance L1, and the closed circuits 84 and 85 that have the mutual inductances M14 and M15 to the circuit 81 and resonate with respect to the circuit 81. The resonance characteristic of the closed circuits 84 and 85 is set based on the relationship between the driving frequency of the gradient field coil 43 and the internal pressure of the static field magnet 41. The circuit 81 corresponds to the first circuit, and the closed circuits 84 and 85 correspond to the second circuits.

For example, the magnetic resonance imaging apparatus 1 calculates energy to be consumed by the equivalent circuit based on the current values (I4(t)-I5(t)) flowing to the equivalent circuit, predicts the rise rate of the magnet internal pressure based on the calculated consumption energy, predicts the heat input amount into the magnet based on the magnet internal pressure rise rate, and adjusts the imaging sequence based on the heat input amount. At this time, the imaging sequence is adjusted such that, for example, the heat input amount does not exceed the threshold concerning quenching. Instead of performing threshold determination using the heat input amount into the magnet, threshold determination may be performed using the rise rate of the magnet internal pressure, and the imaging sequence may be adjusted such that the rise rate of the magnet internal pressure does not exceed the threshold concerning quenching.

Also, the equivalent circuit includes the second circuits (84 and 85) as many as the number of resonance points of the gradient field coil 43. The energies E4 and E5 consumed by the closed circuits 84 and 85 correspond to energies at which the GCIH derived from the mechanical vibration of the gradient field coil 43 causes a magnet internal pressure rise. For this reason, the energies E4 and E5 consumed by the closed circuits 84 and 85 correspond to the rise rate of the magnet internal pressure, and the power consumption (the consumption energies E4 and E5 per unit time) corresponds to the heat input amount into the static field magnet 41. That is, the equivalent circuit is designed in consideration of the frequency characteristic of the GCIH derived from the mechanical vibration of the gradient field coil 43.

With the above-described configuration, in the magnetic resonance imaging apparatus 1 according to this embodiment, focusing on a current value flowing to the equivalent circuit, the current value is calculated, the consumption energy of the equivalent circuit is calculated from the obtained current value, and the rise rate of the magnet internal pressure and the heat input amount are calculated based on the calculated consumption energy. This makes it possible to predict the energy that causes the magnet internal pressure rise, and also predict the heat input amount by GCIH. Then, the sequence is adjusted such that the heat input amount becomes smaller than a limit value at which quenching occurs, thereby suppressing the risk of quenching by GCIH without limiting the specifications of the sequence more than necessity. It is therefore possible to execute the imaging sequence under the optimum conditions for exploiting the performance of the gradient field generation system.

In addition, the equivalent circuit further includes the closed circuits 82 and 83 having mutual inductances (M12 and M13) to the circuit 81. The energies E2 and E3 consumed by the closed circuits 82 and 83 correspond to the rise rate of the magnet internal pressure derived from the leakage flux. The power consumption (the consumption energies E2 and E3 per unit time) corresponds to the heat input amount into the static field magnet 41. The closed circuits 82 and 83 correspond to the third circuit. That is, the equivalent circuit is designed in consideration of the rise rate of the magnet internal pressure and the heat input amount derived from both the mechanical vibration of the gradient field coil 43 and the leakage flux. When this equivalent circuit is used, the energy that causes the magnet internal pressure rise and heat input into the magnet can more correctly be predicted. By adjusting the sequence based on the prediction result, the imaging sequence can be executed under more optimized conditions.

(Modifications)

Note that the magnet temperature of the static field magnet 41 may be used in place of the magnet internal pressure. In this case, an equivalent circuit to the magnet temperature is used, and the resonance characteristic of the closed circuits 84 and 85 is set based on the relationship between the driving frequency of the gradient field coil 43 and the magnet temperature. In this case, the energies E4 and E5 consumed by the closed circuits 84 and 85 correspond to the rise rate of the magnet temperature by GCIH derived from the mechanical vibration of the gradient field coil 43. The rise rate of the magnet temperature is predicted based on the consumption energies E4 and E5, and the imaging sequence is adjusted such that the rise rate of the magnet temperature does not exceed the threshold of the heat amount concerning quenching.

Both the magnet internal pressure and the magnet temperature of the static field magnet 41 may be used. In this case, in addition to the equivalent circuit to the magnet internal pressure, the equivalent circuit to the magnet temperature is used, and both the rise rate of the magnet internal pressure and the rise rate of the magnet temperature are predicted based on the consumption energies of the equivalent circuits. Then, the imaging sequence is adjusted such that the rise rate of the magnet internal pressure does not exceed the threshold of the heat amount concerning quenching, and the rise rate of the magnet temperature does not exceed the threshold of the heat amount concerning quenching.

The above-described configuration is merely an example of the circuit configuration of the equivalent circuit, and the embodiment is not limited to the above-described example. For example, the number of resonance circuits (84 and 85) is not limited to two and may be, for example, one or three or more. In addition, the number of closed circuits (82 and 83) is not limited to two and may be, for example, one or three or more. If the influence of the leakage flux on GCIH is small, the closed circuits (82 and 83) may be omitted.

Also, in this embodiment, an example in which the equivalent circuit including two resonance circuits 84 and 85 is used in consideration of the frequency characteristic of the frequency band in which two resonance points exist has been described. However, the present invention is not limited to this. The equivalent circuit may also consider the frequency characteristic of a frequency band including a frequency higher than the frequency band mainly used in the sequence. If three or more resonance points exist in the frequency band, the equivalent circuit is provided with three resonance circuits.

A configuration that adjusts the sequence in advance has been described. The sequence may be adjusted by predicting the magnet internal pressure or the magnet temperature during execution of the sequence and changing the imaging conditions and the like.

In the above embodiment, a method of predicting the rise rate of the magnet internal pressure based on a response obtained when the sequence waveform at the time of execution of the imaging sequence is input to the equivalent circuit that is an electric circuit model, and preventing quenching due to GCIH has been described. The sequence waveform is known as a waveform for driving the gradient field from now on. For this reason, when Fast Fourier Transform (FFT) is performed for the sequence waveform, it can be used as a gradient field strength waveform on the frequency axis. That is, the rise rate of the magnet internal pressure can be predicted using a frequency component generated by FFT in place of the equivalent circuit. For example, FIG. 3 is equivalent to a graph generated by measuring the rise rate of the magnet internal pressure obtained when the gradient field coil 43 is driven using a predetermined input current and a predetermined frequency while gradually changing the frequency. Hence, when the frequency component obtained by the FFT of the sequence waveform is weighted by a value obtained at P2 in FIG. 3, the rise rate of the magnet internal pressure can be predicted. For example, in a case where, as the result of the FFT of the sequence waveform, a component corresponding to the frequency F1 shown in FIG. 3 is sufficiently small in the frequency component obtained by the FFT, even if the component is multiplied by the weight obtained at P2 in FIG. 3, the prediction value of the rise rate of the magnet internal pressure does not have a peak like P2 in FIG. 3 at the frequency F1. Hence, it can be confirmed that the possibility of quenching in a case where the imaging sequence is executed is low, and inspection can be executed without correcting the imaging sequence.

On the other hand, as the result of performing FFT for the sequence waveform and executing weighting by a value obtained at P2 in FIG. 3, if the prediction value of the rise rate of the magnet internal pressure has a peak at the frequency of the frequency F1 and is larger than a reference value, it is possible to propose, to the operator, lowering the peak of the prediction value of the rise rate of the magnet internal pressure at the frequency F1 by, for example, prolonging the repetition interval (TR) or lowering the resolution and lowering the risk of quenching. This proposal can be executed by a method of, for example, displaying a popup in the shape of an operation panel on the display.

According to at least one embodiment described above, it is possible to execute an imaging sequence under optimized conditions while safely driving the gradient field generation system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic resonance imaging apparatus, comprising:
 a processing circuit configured to
  predict, based on an imaging sequence of magnetic resonance imaging and a relationship between a driving frequency of a gradient field coil and one of a magnet internal pressure and a magnet temperature of a static field magnet, the one of the magnet internal pressure and the magnet temperature at a time of execution of the imaging sequence,
  adjust the imaging sequence based on a prediction result, and
  execute the adjusted imaging sequence,
 wherein the processing circuit is further configured to calculate, using an equivalent circuit to the one of the magnet internal pressure and the magnet temperature, a current value flowing to the equivalent circuit based on the imaging sequence, and predict the one of the magnet internal pressure and the magnet temperature at the time of the execution of the imaging sequence based on the current value
 the equivalent circuit is generated based on the relationship, and includes a first circuit connected to a power supply equivalent to a gradient field power supply and having a self inductance, and a second circuit having a mutual inductance to the first circuit and resonating with respect to the first circuit, and
 a resonance characteristic of the second circuit is set based on the relationship.

2. The apparatus according to claim 1, wherein the processing circuit is further configured to calculate, based on the calculated current value, an energy consumed by the second circuit, predict one of a rise rate of the magnet internal pressure, a rise rate of the magnet temperature, and a heat input amount into the static field magnet based on the energy, and adjust the imaging sequence based on one of the rise rate and the heat input amount.

3. The apparatus according to claim 2, wherein the processing circuit is further configured to adjust the imaging sequence such that the one of the rise rate and the heat input amount does not exceed a threshold concerning quenching.

4. The apparatus according to claim 1, wherein the energy consumed by the second circuit corresponds to one of a rise rate of the magnet internal pressure derived from a mechanical vibration of the gradient field coil, a rise rate of the magnet temperature, and a beat input amount into the static field magnet.

5. The apparatus according to claim 1, wherein the equivalent circuit includes a plurality of the second circuits, as many as a number of resonance points of the gradient field coil.

6. The apparatus according to claim 1, wherein
the equivalent circuit further includes a third circuit having a mutual inductance with the first circuit, and
an energy consumed by the third circuit corresponds to one of a rise rate of the magnet internal pressure derived from a leakage flux of a gradient field, a rise rate of the magnet temperature, and a heat input amount into the static field magnet.

7. The apparatus according to claim 1, wherein the processing circuit is further configured to predict a heat input amount into the static field magnet at the time of the execution of the imaging sequence based on a prediction result of the magnet internal pressure, and adjust the imaging sequence based on a prediction result of the heat input amount.

8. A magnetic resonance imaging apparatus, comprising:
a processing circuit configured to
predict, based on an imaging sequence of magnetic resonance imaging and a relationship between a driving frequency of a gradient field coil and one of a magnet internal pressure and a magnet temperature of a static field magnet, the one of the magnet internal pressure and the magnet temperature at a time of execution of the imaging sequence,
adjust the imaging sequence based on a prediction result, and
execute the adjusted imaging sequence,
wherein the processing circuit is further configured to predict the one of the magnet internal pressure and the magnet temperature at the time of the execution of the imaging sequence based on a frequency component generated by Fourier transforming a waveform of the imaging sequence and the relationship.

* * * * *